(12) United States Patent
Mun et al.

(10) Patent No.: US 11,379,900 B1
(45) Date of Patent: Jul. 5, 2022

(54) ELECTRONIC APPARATUS, MANUFACTURE, AND INFORMATION PROVIDING METHOD THEREOF

(71) Applicant: Coupang Corp., Seoul (KR)

(72) Inventors: Jun Young Mun, Seoul (KR); Ha Yeon Kim, Seoul (KR); Yoon Mi Park, Seoul (KR); I Seul Han, Seoul (KR); Eok Hyun Lee, Seoul (KR); Min Ji Kim, Seoul (KR); Dong Geon Lim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/221,636

(22) Filed: Apr. 2, 2021

(30) Foreign Application Priority Data

Mar. 5, 2021  (KR) .................. 10-2021-0029213

(51) Int. Cl.
 *G06Q 30/00* (2012.01)
 *G06Q 30/06* (2012.01)
 (Continued)

(52) U.S. Cl.
 CPC ....... *G06Q 30/0629* (2013.01); *G06F 16/285* (2019.01); *G06F 16/9538* (2019.01); *G06N 20/00* (2019.01); *G06Q 30/0625* (2013.01); *G06Q 30/0633* (2013.01); *G06Q 30/0643* (2013.01)

(58) Field of Classification Search
 CPC ...... G06Q 30/0601–0645; G06Q 30/08; G06F 16/285; G06F 16/9538; G06N 20/00
 See application file for complete search history.

(56) References Cited

U.S. PATENT DOCUMENTS 9,235,860 B1 * 1/2016 Boucher ............ G06Q 30/0641
9,773,269 B1 * 9/2017 Lazarus ............. G06F 16/5838
(Continued)

FOREIGN PATENT DOCUMENTS

KR 10-2009-0007060 A 1/2009
KR 10-2014-0007122 A 1/2014
(Continued)

OTHER PUBLICATIONS

Kim, Kwanho, et al. "Revenue Maximizing Itemset Construction for Online Shopping Services." Industrial Management & Data Systems 113.1 (2013): 96-116. ProQuest. Web. Aug. 12, 2021. (Year: 2013).*
(Continued)

*Primary Examiner* — Jeffrey A. Smith
*Assistant Examiner* — Kennedy Gibson-Wynn
(74) *Attorney, Agent, or Firm* — Knobbe, Martens, Olson & Bear, LLP

(57) ABSTRACT

Provided is an information providing method of an electronic apparatus. The information providing method may include acquiring a search term from a user, identifying at least one first category related to a product corresponding to the search term, identifying a second category corresponding to a subcategory of the first category and an image corresponding to the second category, and displaying a product list corresponding to the search term in a first region and displaying the image and information on the second category in a second region distinct from the first region.

13 Claims, 6 Drawing Sheets

(51) Int. Cl.
   *G06F 16/28*      (2019.01)
   *G06N 20/00*      (2019.01)
   *G06F 16/9538*    (2019.01)

(56) References Cited

U.S. PATENT DOCUMENTS

| | | | |
|---|---|---|---|
| 10,304,111 B1* | 5/2019 | Sarmento | G06Q 30/06 |
| 10,606,884 B1* | 3/2020 | Mongrain | G06F 16/583 |
| 11,074,646 B1* | 7/2021 | Singhal | G06Q 30/0643 |
| 11,200,740 B1* | 12/2021 | Samuel | G06F 3/04815 |
| 2015/0212689 A1* | 7/2015 | Gomez-Rosado | G06Q 30/0643 |
| 2018/0181569 A1* | 6/2018 | Jarr | G06F 16/5838 |
| 2021/0073583 A1* | 3/2021 | Dagan | G06K 9/6271 |

FOREIGN PATENT DOCUMENTS

| | | |
|---|---|---|
| KR | 10-2015-0081151 A | 7/2015 |
| KR | 10-2016-0024310 A | 3/2016 |
| KR | 10-1616958 B1 | 4/2016 |
| KR | 10-2017-0085771 A | 7/2017 |
| KR | 10-2020-0027586 A | 3/2020 |
| KR | 10-2020-0078170 A | 7/2020 |
| KR | 10-2020-0079108 A | 7/2020 |
| KR | 10-2142126 B1 | 8/2020 |

OTHER PUBLICATIONS

Liu, Hao. "Learning Users' Interest to Assist Image Browsing and Searching." Order No. 3222677 The Chinese University of Hong Kong (Hong Kong), 2005. Ann Arbor: ProQuest. Web. Mar. 9, 2022. (Year: 2005).*

* cited by examiner

ELECTRONIC APPARATUS, MANUFACTURE, AND INFORMATION PROVIDING METHOD THEREOF

BACKGROUND

Technical Field

The present disclosure relates to an electronic apparatus for providing information related to a sub-category and an image corresponding to the sub-category in response to a search term that a purchaser has entered and an information providing method thereof.

Description of the Related Art

When a purchaser attempts to purchase a product using an application, the purchaser may enter a search term, and a list of products corresponding to the search term may be displayed on a screen. In this case, it is an important factor in online commerce to provide information related to a product that the purchaser may purchase. Accordingly, providing related information for purchaser convenience may be a competitive edge in online commerce. Therefore, in order to induce a purchaser to make a purchase and improve the convenience of providing services, there is a need for a technology capable of effectively providing related information corresponding to a search term that the purchaser has entered.

SUMMARY

Technical Goals

Example embodiments disclose an electronic apparatus and an information providing method thereof. However, the technical challenges to be achieved by the example embodiments are not limited to the above-mentioned technical challenges, and other technical challenges may be inferred from the following example embodiments.

Technical Solutions

According to a first example embodiment, there is provided an information providing method of an electronic apparatus, the information providing method including acquiring a search term from a user, identifying at least one first category related to a product corresponding to the search term, identifying a second category corresponding to a subcategory of the first category and an image corresponding to the second category, and displaying a product list corresponding to the search term in a first region and displaying the image and information on the second category in a second region distinct from the first region.

According to an example embodiment, the image corresponding to the second category may be an image included in information on or regarding at least one product selected from among products included in the second category.

According to an example embodiment, the image corresponding to the second category may be updated based on a preset time condition.

According to an example embodiment, the at least one selected product may be selected from among the products included in the second category on the basis of sales information and review information.

According to an example embodiment, the at least one selected product may be selected from among the products included in the second category on the basis of an entity that sells the product.

According to an example embodiment, the information providing method may further include displaying a product list corresponding to the second category on the basis of an input corresponding to the image.

According to an example embodiment, the information providing method may further include displaying a third category corresponding to a subcategory of the second category and an image corresponding to the third category in a region distinct from a region where the product list corresponding to the second category is displayed.

According to an example embodiment, the identifying of at least one first category corresponding to the search term may include identifying a first category, which is a category with the lowest hierarchy, among a plurality of categories corresponding to the search term, the first region may display a product list related to the first category corresponding to the search term, and the second region may display information related to the second category.

According to an example embodiment, the identifying of at least one first category corresponding to the search term may include identifying a first category using a learning model based on image information related to the product, and the learning model may identify a first category corresponding to the lowest hierarchy category from among a plurality of categories corresponding to the product.

According to an example embodiment, the identifying of at least one first category related to the product corresponding to the search term may include identifying the product corresponding to the search term on the basis of information prestored or previously stored in a database and identifying at least one first category related to the product.

According to an example embodiment, the size of the image corresponding to the second category may be determined based on sales information and review information of a product included in the second category.

According to an example embodiment, the image may be updated according to a preset time condition determined on the basis of an attribute of the product included in the second category.

According to an example embodiment, the information providing method may further include providing different pieces of information on the basis of the user's input pattern for the image corresponding to the second category. The providing of different pieces of information on the basis of the user's input pattern may include switching a screen to a product page from which the image is extracted and providing information on or regarding a product from which the image is extracted when the user clicks on the image for a certain period of time, switching the screen to a page that shows a list of top-selling products for each of a plurality of second categories and providing related information when the user clicks on the image more than a certain number of times, or providing information on a product list corresponding to the second category in a separate screen when the user applies a drag input to the image.

According to a second example embodiment, there is provided an electronic apparatus including a communication device, a display, and a controller configured to identify a search term acquired from a user, identify at least one first category related to a product corresponding to the search term, identify a second category corresponding to a subcategory of the first category and an image corresponding to the second category, provide related information to the display such that a product list corresponding to the search term is displayed in a first region, and provide related information to the display such that the image and information on the second category are displayed in a second region distinct from the first region.

According to a third example embodiment, there is provided a computer-readable recording medium including a non-transitory recording medium having a program recorded thereon to cause a computer to execute the above method.

Any other specific details of the example embodiments are included in the detailed description and drawings.

Effects

According to the present disclosure, the electronic apparatus can effectively provide information on related products to a purchaser by providing a second category corresponding to a search term and an image of the second category. Here, the second category is a subcategory of the first category corresponding to the search term, and an image corresponding to the second category can be automatically updated based on a certain condition, thus improving the convenience of image management. Also, the first category is a category with the lowest hierarchy among a plurality of categories corresponding to the search term, and by providing a product list more suitable for a search term entered by a customer, it is possible to improve the customer's purchase rate. Also, when there are a plurality of second categories, the order in which the second categories are displayed may be determined based on related information such as sales information, review information, and a purchase history, and thus it is possible to improve a customer's purchase rate. Also, by providing different pieces of information based on a customer's input pattern for an image, it is possible to improve convenience in use and thus increase customer reliability. Also, by setting different update periods depending on attributes of products, it is possible to efficiently provide related information to a customer who wants to purchase a corresponding product.

Advantageous effects of the present disclosure are not limited to the aforementioned effects, and other effects which are not mentioned here can be clearly understood by those skilled in the art from the appended claims.

DETAILED DESCRIPTION

The terms used herein have been selected as general terms which are widely used at present in consideration of the functions of the present disclosure but may be altered according to the intent of an operator skilled in the art, conventional practice, or introduction of new technology. In addition, specific terms have been arbitrarily selected by the applicant and their meanings will be described in detail in the corresponding sections. Therefore, the terms used herein should be defined on the basis of the overall content of the present disclosure instead of simply the names of the terms.

Throughout the specification, when a part is referred to as including a certain element, this means that the part may include other elements rather than excluding other elements unless otherwise stated. Also, terms such as "-er," "-or," and "module" used herein refer to an element for performing at least one function or operation and may be implemented with hardware, software, or a combination thereof.

An expression "at least one of a, b, and c" used herein may encompass "only a," "only b," "only c," "a and b," "a and c," "b and c," or "all of a, b, and c."

The term "terminal" mentioned below may be implemented as a computer or portable terminal that can access a server or another terminal over a network. Here, a computer may include, for example, a notebook, a desktop, a laptop, and the like which are equipped with a web browser, and a portable terminal may be, for example, a wireless communication apparatus that guarantees portability and mobility and may include any kind of handheld-based wireless communication apparatus such as a terminal, a smartphone, and a tablet PC that are based on communication such as International Mobile Telecommunication (IMT), Code Division Multiple Access (CDMA), W-Code Division Multiple Access (W-CDMA), and Long Term Evolution (LTE).

Hereinafter, example embodiments of the present disclosure will be fully described with reference to the accompanying drawings in such a way that those skilled in the art can easily carry out the example embodiments. The disclosure may, however, be embodied in many different forms and should not be construed as being limited to the example embodiments set forth herein.

Hereinafter, the example embodiments of the present disclosure will be described in detail with reference to the accompanying drawings.

Figure 1:
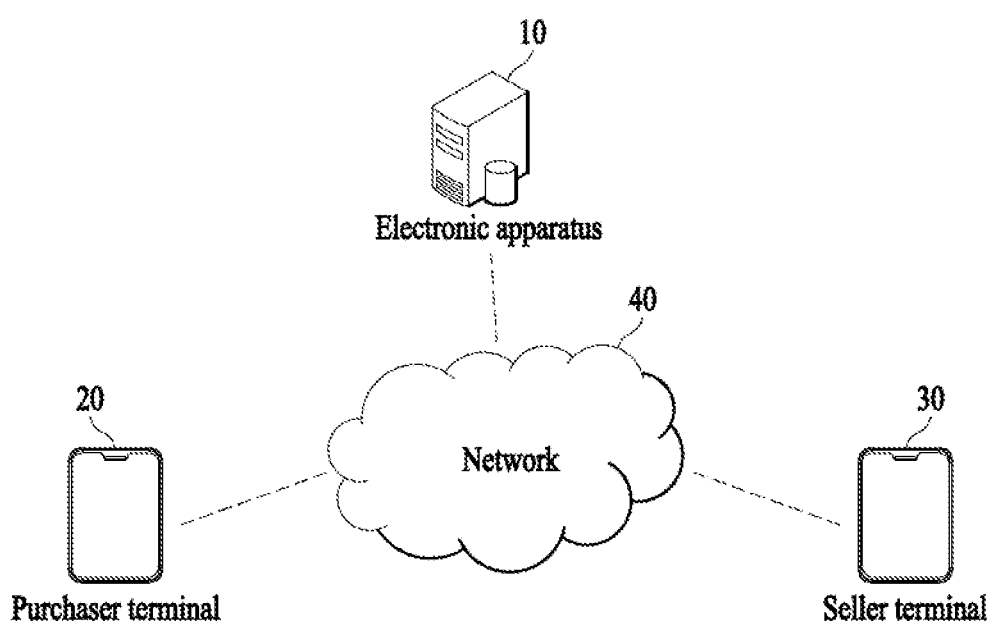
FIG. 1 shows a system according to an example embodiment.

FIG. 1 shows a system according to an example embodiment.

Referring to FIG. 1, the system may include an electronic apparatus 10, a purchaser terminal 20, a seller terminal 30, and a network 40. In the system shown in FIG. 1, only elements related to this example embodiment are shown. Therefore, it can be understood by those skilled in the art that general-purpose elements other than the elements shown in FIG. 1 may be further included.

The electronic apparatus 10, the purchaser terminal 20, and the seller terminal 30 may communicate with each other over the network 40. The network 40 includes a local area network (LAN), a wide area network (WAN), a value added network (VAN), a mobile radio communication network, a satellite communication network, and a combination thereof and is a data communication network in a comprehensive sense that enables the network members shown in FIG. 1 to smoothly communicate with each other. The network 40 may include a wired Internet, a wireless Internet, and a mobile wireless communication network. The wireless communication may be, for example, wireless LAN (Wi-Fi), Bluetooth, Bluetooth Low Energy (BLE), Zigbee, Wi-Fi Direct (WFD), Ultra Wideband (UWB), Infrared Data Association (IrDA), Near Field Communication (NFC), and the like, but the present disclosure is not limited thereto.

The electronic apparatus 10 may provide all information related to a product to sell the product to a purchaser and may be included in a server that provides product-related information. Specifically, the electronic apparatus 10 may identify product-related information that a seller has entered using the seller terminal 30. Also, the electronic apparatus 10 may identify a search term that a purchaser has entered using the purchaser terminal 20. The electronic apparatus 10 may identify a product list corresponding to the search term and provide related information using an application installed on the purchaser terminal 20. In this case, the product list corresponding to the search term may be displayed in a first region, and related information corresponding to a sub-category of the search term may be displayed in a second region distinct from the first region.

The electronic apparatus 10 may provide an application for providing information to the purchaser terminal 20 and the seller terminal 30. The purchaser terminal 20 may be a terminal that the purchaser uses, and the seller terminal 30 may be a terminal that the seller uses. The seller may provide product-related information to the electronic apparatus 10 through the seller terminal 30, and the purchaser may identify, through the purchaser terminal 20, a product list corresponding to the search term using information provided from the electronic apparatus 10.

Hereinafter, a specific process performed in the electronic apparatus 10, the purchaser terminal 20, and the seller terminal 30 will be described in relation to information provision.

Figure 2:
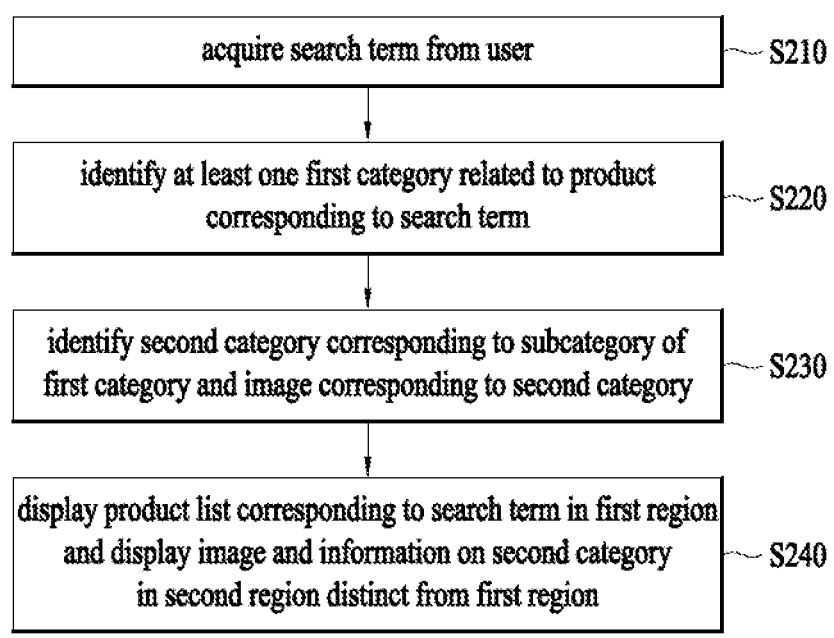
FIG. 2 shows an example embodiment of an information providing method performed by an electronic apparatus.

FIG. 2 shows an example embodiment of an information providing method performed by an electronic apparatus.

Referring to FIG. 2, in operation S210, the electronic apparatus may acquire a search term from a user. Here, the user may be a purchaser and may enter a search term using a purchaser terminal, and electronic apparatus may identify the entered search term using an application.

According to an example embodiment, when the user enters a search term consisting of one word, the electronic apparatus may identify product-related information corresponding to the search term on the basis of information prestored or previously stored in a database. For example, when the user enters "shorts," the electronic apparatus may identify product-related information corresponding to "shorts" on the basis of the information prestored in the database.

According to an example embodiment, when the user enters a search term consisting of several words, the electronic apparatus may identify product-related information corresponding to the search term identified through syntax analysis. For example, when the user enters "shorts worn by many high school male students?," the electronic apparatus may analyze a search term through syntax analysis, identify "teenage boy shorts," and identify product-related information corresponding to "teenage boy shorts." Here, in relation to syntax analysis, a learning model based on a neural network may be used, and as a detailed description thereof, the content used in the related technical field may be applied.

According to an example embodiment, based on a category corresponding to products related to the search term that the user has entered, the electronic apparatus device may determine a category corresponding to the search term. The category corresponding to the search term may be determined using a category corresponding to products found through the search term rather than a category matching the search term itself. For example, when the user enters a search term "men's shorts," products 1 to N may be displayed through the search term "men's shorts." In this case, corresponding categories may be preset for products 1 to N. The electronic apparatus cannot identify the category that matches the search term "men's shorts," and may determine a category corresponding to the search term by using the categories corresponding to products 1 to N displayed through the search term "men's shorts." More specifically, when categories corresponding to 100 products displayed according to the search term "men's shorts" include a category "men's shorts" for 70%, a category "shorts" for 20%, and a category "bottoms" for 10%, the electronic apparatus may determine "men's shorts" having the most search results as a first category corresponding to the search term. Accordingly, by using a category matching products themselves displayed according to the search term rather than by using a category matching the search term itself, the electronic apparatus may more accurately and efficiently identify the category.

In operation S220, the electronic apparatus may identify at least one first category related to products corresponding to the search term.

The purchaser may purchase a product on the basis of information uploaded to the electronic apparatus by the seller and may purchase a product on the basis of information uploaded by a service provider who has purchased the product from the seller. Here, the service provider may be an entity that provides a service related to product sales to the purchaser using the electronic apparatus. That is, a product that the purchaser may purchase through the electronic apparatus may be a product that the seller is selling or a product that the service provider has purchased from the seller and then is selling. When a product is uploaded to the electronic apparatus, information-related to the product may be entered. In this case, the product-related information may include information on a category of the product. Specifically, since a product being sold through the electronic apparatus may correspond to at least one category, related information may be entered when the product is uploaded. For example, a product "shorts" may correspond to a "clothing" category, a "men's clothing" category, a "men's bottoms" category, and a "shorts" category. In this case, the "clothing" category, the "men's clothing" category, the "men's bottoms" category, and the "shorts" category corresponding to "shorts" may be identified when the product "shorts" is uploaded. Therefore, when the purchaser enters a search term "shorts," the "clothing" category," the "men's clothing" category, the "men's bottoms" category, and the "shorts" category may be identified as related categories. That is, a plurality of categories corresponding to the search term "shorts" may be identified. In this case, the "clothing" category, the "men's clothing" category, and the "men's bottoms" category may be parent categories of the "shorts" category. Also, the "clothing" category and the "men's clothing" category may be parent categories of the "men's bottom category." Also, the "clothing" category may be a parent category of the "men's clothing" category.

Alternatively, when a product is uploaded to the electronic apparatus, information on or regarding a product category may be identified using a learning model based on image information related to the product even if the seller does not enter information related to the product. Specifically, the electronic apparatus may automatically classify the category of the product on the basis of image information related to the product. For example, when the seller does not enter a category related to a product "shorts," the electronic apparatus may automatically classify the product into the "clothing" category, the "men's clothing" category, the "men's bottoms" category, and the "shorts" category on the basis of the image information of the "shorts" product. Therefore, when the purchaser enters a search term "shorts," even a product for which the seller has not entered a related category may be disclosed as a search result. A learning model based on a neural network may be previously learned based on technologies applied in related technical fields.

According to an example embodiment, the electronic apparatus may identify a first category among a plurality of categories related to a product corresponding to the search term. In this case, the first category may correspond to a category with the lowest hierarchy among the plurality of categories. For example, the "shorts" category with the lowest hierarchy among the "clothing" category, the "men's clothing" category, the "men's bottoms" category, and the "shorts" category corresponding to the search term "shorts" may be the first category. Here, the "clothing" category, the "men's clothing" category, and the "men's bottoms" category may be parent categories of the first category. This is because, as a search result according to the user's search, disclosing only the most suitable products for the search term may increase the user's purchase rate. For example, this is because disclosing products corresponding to the "shorts" category rather than disclosing products corresponding to the "men's clothing" category in response to the search term "shorts" may increase the user's purchase rate.

According to an example embodiment, the electronic apparatus may determine the first category corresponding to the search term using a category matching products disclosed through the search term rather than a category matching the search term itself. For example, when a search term "men's shorts" is entered, a first category corresponding to the search term "men's shorts" may be determined using a preset category matching products 1 to N displayed according to the search term. The seller may upload information related to the category matching products 1 to N, the electronic apparatus may determine the first category corresponding to the search term among a plurality of categories matching a plurality of products displayed on a screen.

In operation S230, the electronic apparatus may identify a second category corresponding to a subcategory of the first category and an image corresponding to the second category.

The electronic apparatus may identify and display a product list corresponding to the first category with the lowest hierarchy among the plurality of categories corresponding to the search term. In this case, the electronic apparatus may identify a second category corresponding to a subcategory of the first category and an image corresponding to the second category. Here, the first category may include a plurality of second categories. In this case, the second category may be a more restricted category than the first category. For example, the second category may correspond to when the first category is limited to brands. For example, the first category with the lowest hierarchy corresponding to the search term "shorts" may be a "shorts" category. In this case, a second category corresponding to a subcategory of the first category may include brand-specific categories such as a Nike's shorts category, an Adidas' shorts category, and a Reebok's shorts category. Alternatively, the second category may correspond to when the first category is limited to styles. For example, the second category may include style-specific categories such as a "running shorts" category and a "yoga shorts" category. As described above, the electronic apparatus may display, in the first region, a product list corresponding to the first category with the lowest hierarchy among the plurality of categories corresponding to the search term. Also, the electronic apparatus may display information corresponding to the second category, which is a subcategory of the first category, in a second region distinct from the first region.

Also, the electronic apparatus may identify an image corresponding to the second category. The electronic apparatus may identify a plurality of second categories, which are subcategories of the first category, and may identify an image corresponding to each of the plurality of second categories. For example, the electronic apparatus may identify an image corresponding to the Nike's shorts category, an image corresponding to the Adidas' shorts category, and an image corresponding to the Reebok's shorts category. Alternatively, the electronic apparatus may identify images corresponding to the "running shorts" category and the "yoga shorts" category.

According to an example embodiment, the image corresponding to the second category may correspond to an image determined based on information on a product selected from among products included in the second category. For example, the image corresponding to the Nike's shorts category may be determined based on information regarding a product selected from among the products included in the Nike's shorts category, the image corresponding to the Adidas' shorts category may be determined based on information regarding a product selected from among the products included in the Adidas' shorts category, and the image corresponding to the Reebok's shorts category may be determined based on information regarding a product selected from among the products included in the Reebok's shorts category. Specifically, the image corresponding to the product may be determined from among the images of the products included in the second category on the basis of at least one of sales information and review information. For example, an image corresponding to Nike's shorts with the most sales among the products included in the Nike's shorts category may be determined as the image corresponding to the Nike's shorts category. Alternatively, an image corresponding to Nike's shorts with the highest rating according to the review information among the products included in the Nike's shorts category may be determined as the image corresponding to the Nike's shorts category.

According to another example embodiment, the image corresponding to the second category may correspond to an image determined based on information on a product selected from among products included in the second category. Specifically, some of the products included in the second category may be products uploaded by a seller, or some of the products included in the second category may be products uploaded by a service provider that has purchased the products from a seller. Here, the service provider may be an entity that provides a service related to product sales to a purchaser using the electronic apparatus. That is, a product that the purchaser may purchase through the electronic apparatus may be a product that the seller is selling or a product that the service provider has purchased from the seller and then is selling. Accordingly, a product selected from among the products included in the second category may be selected based on an entity that sells the product (e.g., a seller or a service provider). More specifically, among the products included in the second category, a product may be selected from among products that a service provider is selling on the basis of sales information and review information. For example, products uploaded by a service provider may be identified among the products included in the Nike's shorts category, and among the uploaded products, an image corresponding to the Nike's shorts with the most sales may be determined as the image corresponding to the Nike's shorts category. For example, products uploaded by a service provider may be identified among the products included in the Nike's shorts category, and among the uploaded products, an image corresponding to the Nike's shorts with the highest rating according to the review information may be determined as the image corresponding to the Nike's shorts category. In this way, by disclosing the image of the product being sold by the service provider, it is possible to prevent various disputes such as copyrights, and thus it is possible to improve customer reliability for provided services.

In this case, the image corresponding to the second category may be updated based on a preset time condition. Specifically, the image corresponding to the second category may be updated when a new product is released among the products included in the second category or at preset intervals (e.g., every month). Alternatively, the image corresponding to the second category may be updated based on attributes of products included in the second category. In this case, the electronic apparatus may preset an update period corresponding to the attributes of the products on the basis of statistical information and may update the image on the basis of the preset update period. Specifically, when the products included in the second category are fashion-related products, the update period of the image corresponding to the second category may be relatively short due to the characteristic of the fashion industry being sensitive to trends. Alternatively, when the products included in the second category are home-appliance-related products, the update period of the image corresponding to the second category may be relatively long due to the characteristics of the home appliances. For example, when the products included in the second category are home-appliance-related products, the image corresponding to the second category may be updated when a new product included in the second category is released. In this case, the update period of the image corresponding to the second category related to home appliances may be relatively longer than the update period of the image corresponding to the second category related to fashion products.

In operation S240, the electronic apparatus may display a product list corresponding to the search term in a first region and may display the image and information on the second category in a second region distinct from the first region.

In the screen displayed on the purchaser terminal, the product list corresponding to the search term may be displayed in the first region, and the image and information on the second category may be displayed in the second region distinct from the first region. For example, a product list corresponding to a search term "shorts" may be displayed in the first region, and the images and information on the second categories such as Nike's shorts and Adidas' shorts may be displayed in the second region distinct from the first region.

According to an example embodiment, when there are a plurality of second categories, which are subcategories of the first category, the order in which the second categories are displayed may be determined based on sales information and the review information. Specifically, the order may be determined based on sales information and review information of products included in the second categories. For example, when a Nike's shorts category, an Adidas' shorts category, and a Reebok's shorts category, which are second categories, are subcategories of the search term "shorts," the order of the Nike's shorts category, the Adidas' shorts category, and the Reebok's shorts category may be determined based on sales information and review information of the products included in the Nike's shorts category, sales information and review information of the products included in the Adidas' shorts category, and sales information and review information of the products included in the Reebok's shorts category. Meanwhile, according to an example embodiment, style-specific subcategories, such as short pants, Jamaican pants, and half pants, may be set as the second categories. According to an example embodiment, such information on the second category may be information provided by the seller. Alternatively, the electronic apparatus may determine to which second category a product corresponds on the basis of image information of the corresponding product.

Alternatively, the order may be determined based on sales information and review information of some top-selling products among the products included in the second categories. For example, the order of the Nike's shorts category, the Adidas' shorts category, and the Reebok's shorts category may be determined based on sales information and review information of the top 5 products among the products included in the Nike's shorts category, sales information and review information of the top 5 products among the products included in the Adidas' shorts category, and sales information and review information of the top 5 products among the products included in the Reebok's shorts category.

According to an example embodiment, when there are a plurality of second categories, which are subcategories of the first category, the size of an image corresponding to each of the second categories displayed in the second region may be determined based on sales information and review information. Specifically, the size of the image may be determined based on sales information and review information of products included in the corresponding second category. For example, when the Nike's shorts category, the Adidas' shorts category, and the Reebok's shorts category, which are second categories, are subcategories of the search term "shorts," the size of the image corresponding to each of the Nike's shorts category, the Adidas' shorts category, and the Reebok's shorts category may be determined based on sales information and review information of the products included in the Nike's shorts category, sales information and review information of the products included in the Adidas' shorts category, and sales information and review information of the products included in the Reebok's shorts category. More specifically, since the image corresponding to the second category may be displayed within the size of the second region, the size of the image corresponding to the second category may be determined in consideration of the size of the second region.

In this case, the minimum size of the image corresponding to the second category may be about half of the maximum size of the image corresponding to the second category. For example, when there are two second categories, an image corresponding to the minimum size and an image corresponding to the maximum size may be determined based on sales information and review information. Alternatively, when there are three second categories, image 1 corresponding to the minimum size, image 2 corresponding to the maximum size, and image 3 corresponding to the medium size may be determined based on sales information and review information. In this case, the size of image 3 relative to the size of image 1 may be determined based on a comparison between the sales information and review information corresponding to the medium size and the sales information and review information corresponding to the minimum size. In this case, the sales information is a more important factor than the review information. The size of the image may be determined in consideration of the review information after considering the ratio between the pieces of sales information first. For example, the size of image 3 may be 30% larger than the size of image 1 on the basis of the ratio between the pieces of sales information, or when the sales information of the products included in the second category is within a preset range, the size of image 3 may be 10% larger than the size of image 1 on the basis of the ratio between the pieces of review information.

According to an example embodiment, when there are a plurality of second categories, which are subcategories of the first category, the size of an image corresponding to each of the second categories displayed in the second region may be determined based on the purchaser's purchase history information. In this case, a service of providing related information based on the purchase history information may be a service that is provided only to users who have joined a premium service and may be a service that is not provided to users who have not joined a premium service. As a result of analyzing a purchase history, a second category with a history of purchases by the purchaser may have a relatively larger image than a second category with no purchase history. This is because the second category with the history of purchases is a category reflecting the purchaser's taste and may better induce the purchaser to purchase a product by providing a larger image. When there are a plurality of second categories with a history of purchases, the sizes of the images may be determined based on the percentage of recurring purchases. In this case, when there are second categories with the same number of recurring purchases, the order may be controlled such that the second category including the most recently purchased product is displayed first, and the images of the second categories may have the same size. For example, when a purchaser has purchased products included in the Nike's shorts category five times, products included in the Adidas' shorts category three times, and products included in the Reebok's shorts category once, the sizes of images corresponding to the Nike's shorts category, the Adidas' shorts category, and the Reebok's shorts category may be determined based on the percentages of recurring purchases. As another example, when a purchaser has purchased products included in the Nike's shorts category five times, products included in the Adidas' shorts category five times, and products included in the Reebok's shorts category once, the image corresponding to the Nike's shorts category has the same size as the image corresponding to the Adidas' shorts category, but the order may be controlled such that the Nike's shorts category including the most recently purchased product is displayed earlier than the Adidas' shorts category.

According to an example embodiment, the image size may be determined in consideration of purchase history information and sales information. In this case, since the purchase history information is more important than the sales information as information suitable for the purchaser's purchase preference, the size of the image may be determined in consideration of the sales information after considering the purchase history information first. For details, refer to the above description.

According to an example embodiment, based on an input to an image corresponding to the second category, the purchaser may move to a page that shows a product list corresponding to the second category. Specifically, when the user selects an image corresponding to the second category in the second region, the electronic apparatus may switch the screen to a page that shows a product list corresponding to the second category. In this case, the electronic apparatus may display a third category corresponding to a subcategory of the second category and an image corresponding to the third category in a region distinct from the region where the product list corresponding to the second category is displayed. That is, the electronic apparatus may display a product list corresponding to the second category in a partial region of the switched screen and also may display the third category and the image corresponding to the third category in a distinct region. For example, when the user selects an image corresponding to the Nike's shorts category, the electronic apparatus may display a screen including a product list corresponding to the Nike's shorts category in a partial region and may display information related to a subcategory of the Nike's shorts category in a distinct region. In this case, subcategories of the Nike's shorts category may be classified according to, for example, the shorts types released by Nike. For example, when the second category is a Nike's shorts category, the third category may be a Nike's shorts M-type category.

According to an example embodiment, the electronic apparatus may display screens that provide different pieces of information on the basis of an input pattern for the image corresponding to the second category. The following input patterns may be realized individually or in combination.

Specifically, when the user clicks on an image corresponding to the second category for a certain period of time or longer, the electronic apparatus may switch the screen to a product page from which the image is extracted. In this case, the certain time is a preset time and may be, for example, 3 seconds. For example, when the user clicks on the image corresponding to the Nike's shorts category for three seconds or longer, the electronic apparatus may switch the screen to a product page from which the image of the Nike's shorts category is extracted. That is, by switching the screen to the product page from which the image of the second category is extracted rather than displaying the screen including the product list corresponding to the second category by the user's click, it is possible to improve the convenience of the user who wants to purchase the corresponding product and thus improve the purchase rate.

Also, when a user clicks on an image corresponding to a second category selected from among a plurality of second categories displayed in the second region a certain number of times or more, the electronic apparatus may switch the screen to a page that shows a list of the top-selling products for each of the plurality of second categories. In this case, the certain number is a preset number and may be, for example, three. For example, when among the image corresponding to the Nike's shorts category, the image corresponding to the Adidas' shorts category, and the image corresponding to the Reebok's shorts category, a user continuously clicks on any image (e.g., the image corresponding to the Adidas' shorts category) three times, the electronic apparatus may switch the screen to a page that shows a list of the top 3 products in the Nike's shorts category, the top 3 products in the Adidas' shorts category, and the top 3 products in the Reebok's shorts category instead of displaying a screen including a product list corresponding to the Adidas' shorts category. That is, by displaying a list of top-selling products in the plurality of second categories, it is possible to improve the convenience of comparison between "shorts" products by brand to increase a user's purchase rate.

Also, when a user applies a drag input to an image corresponding to a second category, the electronic apparatus may display a product list corresponding to the corresponding second category in a separate tab. For example, when a user applies a drag input to the image corresponding to the Nike's shorts category, the electronic apparatus may display a product list corresponding to the Nike's shorts category in a separate tab. As another example, when a user applies a drag input to the image corresponding to the Adidas' shorts category, the electronic apparatus may display a product list corresponding to the Adidas' shorts category in a separate tab. As another example, when a user applies a drag input to the image corresponding to the Reebok's shorts category, the electronic apparatus may display a product list corresponding to the Reebok's shorts category in a separate tab. Therefore, based on a drag input to an image, the electronic apparatus may display product lists corresponding to different second categories in a plurality of tabs.

Figure 3:
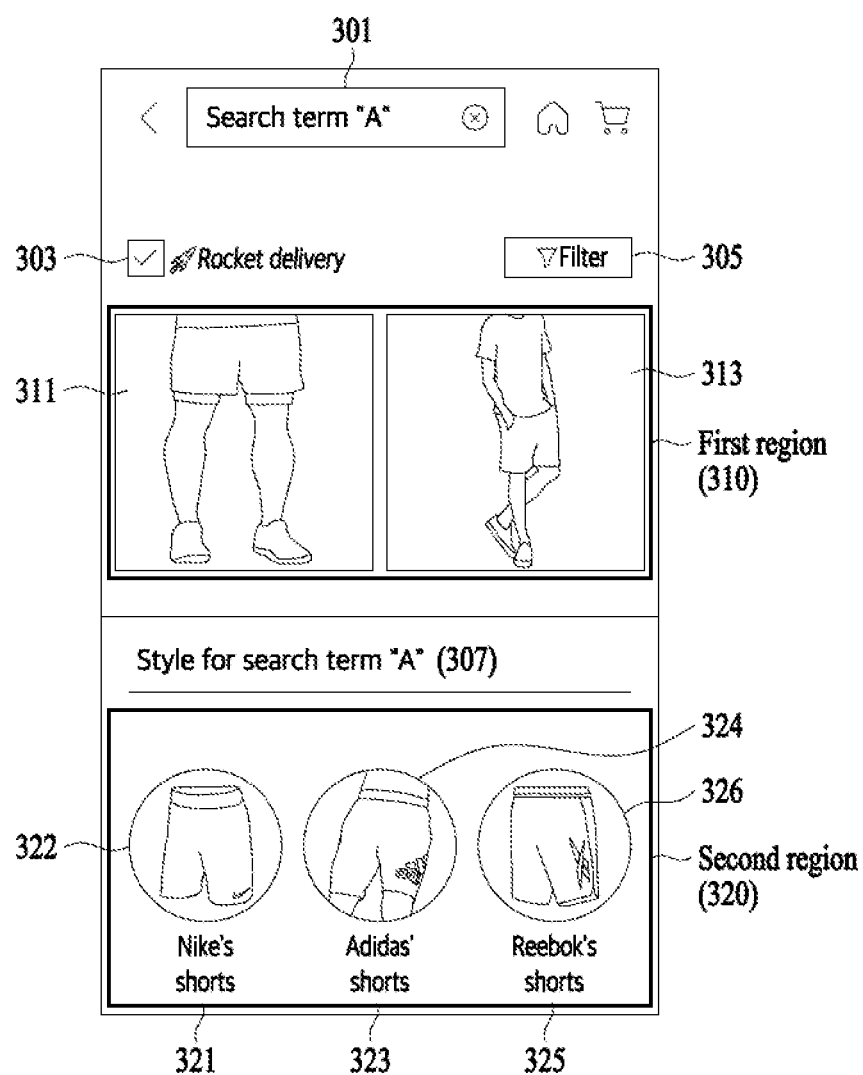
FIG. 3 shows a screen displaying a second category and an image corresponding to the second category on the basis of a search term according to an example embodiment.

FIG. 3 shows a screen displaying a second category and an image corresponding to the second category on the basis of a search term according to an example embodiment.

Referring to FIG. 3, a search term "A" may be entered into a search term input window 301 by a user. The electronic apparatus may identify at least one first category related to products corresponding to the search term "A." For example, when the user enters "shorts" as a search term, the electronic apparatus may identify at least one first category related to products corresponding to "shorts." The products corresponding to the search term "shorts" may correspond to a "clothing" category, a "men's clothing" category, a "men's bottoms" category, and a "shorts" category, and the electronic apparatus may determine the "shorts" category with the lowest hierarchy among the plurality of categories as a first category.

In this case, a rocket 303 in the screen is a kind of delivery service provided to a service provider and represents a delivery service that is much faster than a normal delivery service. When the rocket 303 is selected, products to which the rocket 303 delivery service is applied may be displayed on the screen. Also, a filter 305 may be a function used when filtering is performed based on an additional condition for the search term "shorts."

The electronic apparatus may display a product list corresponding to the search term "A" in a first region 310. Products 311 and 313 displayed in the first region 310 are products which correspond to the search term "A" and which may be displayed based on a certain condition regardless of the second category. For example, the products 311 and 313 related to shorts displayed in the first region 310 may be displayed in a sales order regardless of the second category.

A region 307 is a part that represents the style for the search term "A" and may represent a second category as a specific style for the search term "A." In this case, a second category corresponding to a subcategory of the first category and an image corresponding to the second category may be displayed in a second region 320 distinct from the first region. As an example, as a subcategory of the "shorts" category, a second category classified by brand may be displayed in the second region 320. In this case, brand is an example, and a second category classified according to another criterion may be displayed. For example, a Nike's shorts category 321, an Adidas' shorts category 323, and a Reebok's shorts category 325 may be second categories, and images 322, 324, and 326 corresponding to the second categories may be displayed in the second region 320.

According to an example embodiment, when there are a plurality of second categories, the order in which the second categories are displayed in the second region 320 may be determined based on sales information and review information. Specifically, the order may be determined based on sales information and review information of products included in the second categories. Alternatively, the order may be determined based on sales information and review information of some top-selling products among the products included in the second categories. For example, the order in which the Nike's shorts category 321, the Adidas' shorts category 323, and the Reebok's shorts category 325 may be determined based on sales information and review information of the top 5 products among the products included in the Nike's shorts category 321, sales information and review information of the top 5 products among the products included in the Adidas' shorts category 323, and sales information and review information of the top 5 products among the products included in the Reebok's shorts category 325.

According to an example embodiment, when a mouse button is positioned on an image corresponding to the second category, the electronic apparatus may additionally display images of several top-selling products in a list of products included in the corresponding second category without screen switching. For example, when a mouse button is positioned on the image 322 corresponding to the Nike's shorts category 321, the images of the top 3 products in a list of products included in the Nike's shorts category 321 may be additionally displayed on the current screen without screen switching. Accordingly, a user may identify products with a large number of sales in a corresponding second category on the current screen without screen switching, and thus it is possible to improve the convenience of comparison for each product and increase the user's purchase rate. In this case, a configuration that additionally displays an image of a product on the current screen without screen switching may be implemented in various ways.

According to an example embodiment, based on an input to an image corresponding to the second category, the user may move to a page that shows a product list corresponding to the second category. For example, when the image 324 corresponding to the Adidas' shorts category 323 is selected by the user, the electronic apparatus may switch the screen to a page that shows a product list included in the Adidas' shorts category 323. In this case, a third category and an image corresponding to the third category may be displayed in a distinct region on the switched screen.

According to an example embodiment, the electronic apparatus may display a screen that provides different pieces of information on the basis of an input pattern for the image corresponding to the second category. The following input patterns may be realized individually or in combination.

As an example, when the user clicks on the image 326 corresponding to the Reebok's shorts category 325 for a predetermined period of time (e.g., 3 seconds) or longer, the electronic apparatus may switch the screen to a product page from which the image 326 is extracted. Therefore, by switching the screen to the product page from which the image 326 of the Reebok's shorts category 325 is extracted rather than displaying the screen including the product list corresponding to the Reebok's shorts category 325 by the user's click, it is possible to improve the convenience of the user who wants to purchase the corresponding product and thus improve the purchase rate.

As another example, when the user clicks on the image corresponding to the second category more than a certain number of times or the user clicks on the region 307 more than a certain number of times, the electronic apparatus may switch the screen to a page that shows a list of top-selling products for each of the plurality of second categories.

As another example, the electronic apparatus may display a product list corresponding to the Nike's shorts category 321 in a separate tab different from the current screen on the basis of a drag input to the image 322 corresponding to the Nike's shorts category 321. Likewise, the electronic apparatus may display a product list corresponding to the Adidas' shorts category 323 in a separate tab different from the current screen on the basis of a drag input to the image 324 corresponding to the Adidas' shorts category 323.

Figure 4:
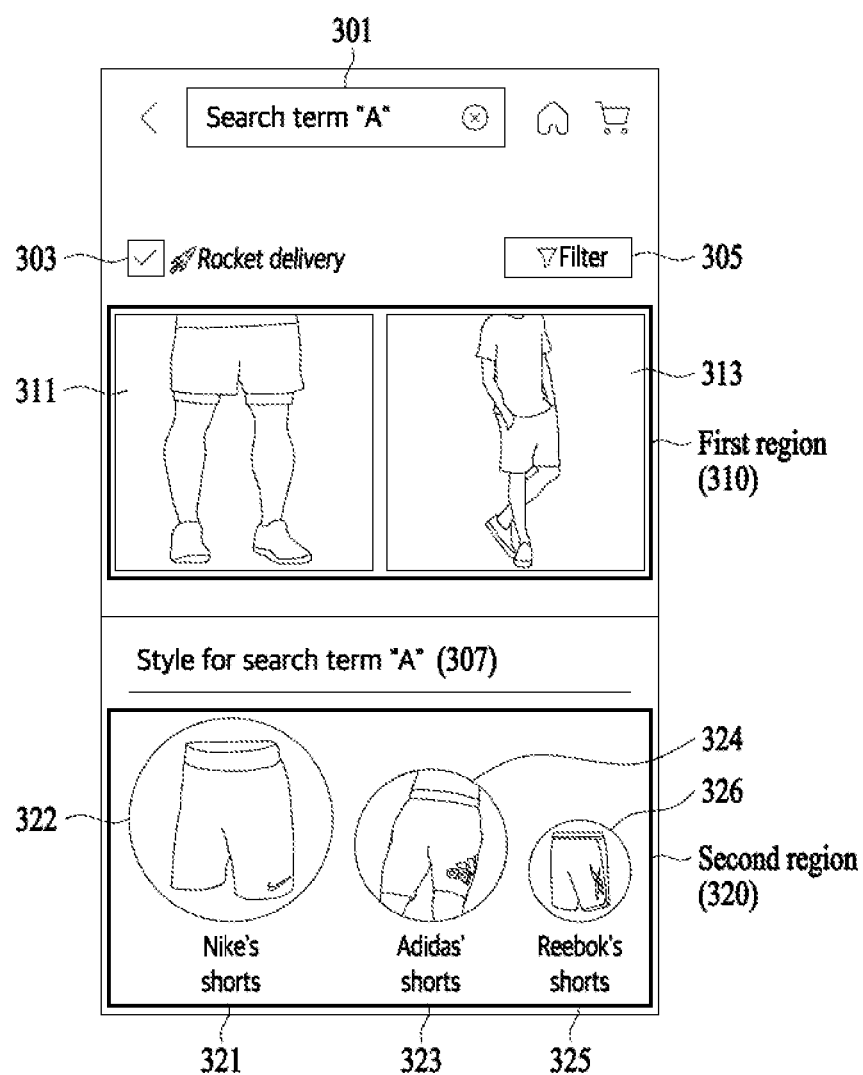
FIG. 4 shows a screen displaying images of different sizes corresponding to second categories according to an example embodiment.

FIG. 4 shows a screen displaying images of different sizes corresponding to second categories according to an example embodiment. The above description may be applied here, and the same descriptions may be applied to the same reference numerals as those of FIG. 3.

Referring to FIG. 4, it can be seen that the image corresponding to the Nike's shorts category 321, the image 324 corresponding to the Adidas' shorts category 323, and the image corresponding to the Reebok's shorts category 325 have different sizes. In this case, it can be seen that the size of the minimum image is half the size of the maximum image, which reflects that the image of the minimum size also needs to be disclosed to a user.

According to an example embodiment, the size of the image corresponding to each of the second category may be determined based on sales information and review information. In this case, the sales information is a more important factor than the review information. The size of the image may be determined in consideration of the review information after considering the ratio between the pieces of sales information first. For example, in the case of 150 sales of the top 3 products included in the Nike's shorts category 321, 130 sales of the top 3 products included in the Adidas' shorts category 323, and 100 sales of the top 3 products included in the Reebok's shorts category 325, the sizes of the images may be determined in the order of the image 322, the image 324, and the image 326. In this case, the size of the image 324 may be 30% larger than the size of the image 326 in consideration of the sales information. As another example, when the number of sales of the products included in the Nike's shorts category 321 are equal to the number of sales of the products included in the Adidas' shorts category 323, the sizes of the images may be determined based on the review information.

According to an example embodiment, the image size may be determined based on a purchaser's purchase history information. The sizes of the displayed images may be determined based on the ratio among the number of times the purchaser has purchased the products included in the Nike's shorts category 321, the number of times the purchaser has purchased the products included in the Adidas' shorts category 323, and the number of times the purchaser has purchased the products included in the Reebok's shorts category 325. For details, refer to the above description.

Figure 5:
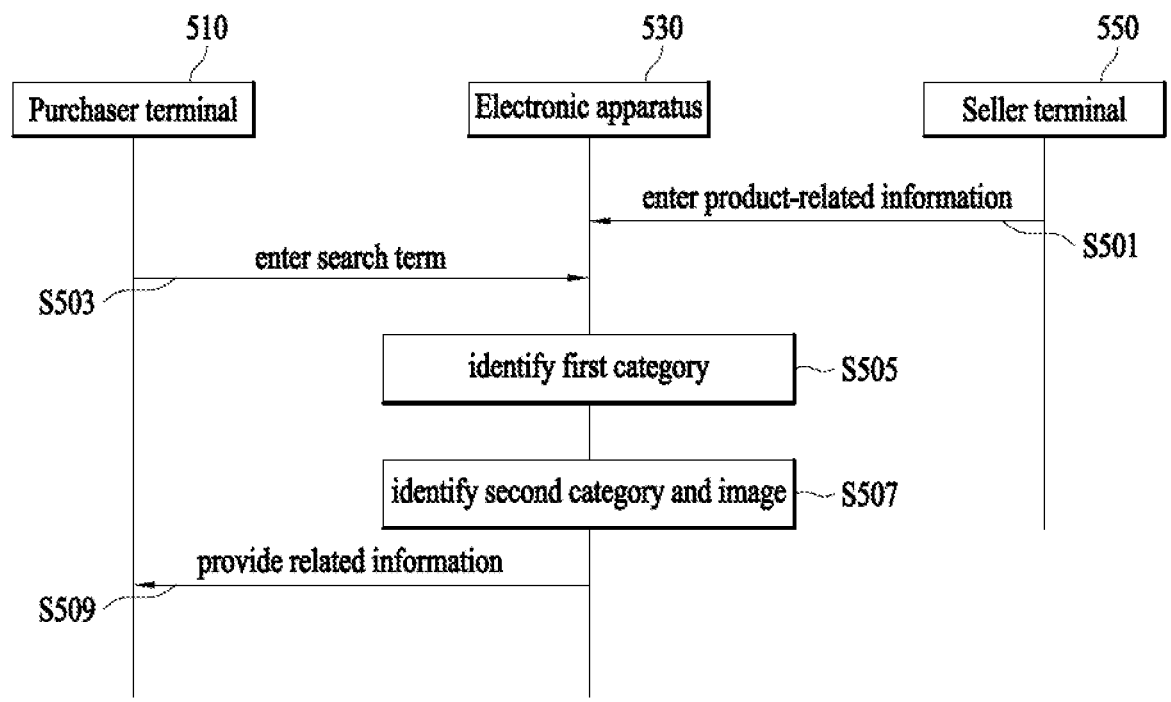
FIG. 5 shows an operation method of an electronic apparatus according to an example embodiment.

FIG. 5 shows an operation method of an electronic apparatus according to an example embodiment.

Referring to FIG. 5, in operation S501, a seller terminal 550 may input information related to a product to transmit the information to an electronic apparatus 530. Specifically, a seller may enter the product-related information when registering a product to be sold using an application installed on the seller terminal 550, and the electronic apparatus 530 may identify the product-related information through the application. In this case, the product-related information may include information on a category of the product. For example, a product related to "men's shorts" may correspond to a "clothing" category, a "men's clothing" category, a "men's bottoms" category, and a "shorts" category.

In operation S503, a purchaser may enter a search term into a purchaser terminal 510, and the electronic apparatus 530 may acquire the entered search term through an application. For example, when a user (purchaser) enters "men's shorts" into a search term input window of the application, the electronic apparatus may acquire the search term entered through the application.

In operation S505, the electronic apparatus may identify a first category corresponding to the search term. Specifically, the electronic apparatus 530 may identify at least one first category related to products corresponding to the search term. In this case, the first category may correspond to a category with the lowest hierarchy among the plurality of categories corresponding to the search term. For example, the "shorts" category with the lowest hierarchy among the "clothing" category, the "men's clothing" category, the "men's bottoms" category, and the "shorts" category corresponding to the search term "men's shorts" may be determined as the first category.

In operation S507, the electronic apparatus may identify a second category and an image corresponding to the second category. In this case, the second category may correspond to a subcategory of the first category, and the image may correspond to an image of a product selected based on a certain condition from a list of products included in the second category. For example, the subcategory of the "shorts" category may include brand-specific subcategories such as the Nike's shorts category, the Adidas' shorts category, and the Reebok's shorts category. In this case, the second categories may be the Nike's shorts category, the Adidas' shorts category, and the Reebok's shorts category. In this case, an image of a product selected based on a certain condition from a list of products included in the Nike's shorts category may be extracted as a representative image of the corresponding category. Likewise, an image of a product selected based on a certain condition from a list of products included in the Adidas' shorts category may be extracted as a representative image of the corresponding category.

In operation S509, the electronic apparatus may provide related information to the purchaser terminal 510. Specifically, the electronic apparatus may provide related information corresponding to the entered search term through the application. The product list corresponding to the search term may be displayed in a first region, and information on and an image of the second category may be displayed in a second region distinct from the first region. In relation to the screen displayed on the purchaser terminal, the screens shown in FIGS. 3 and 4 may be referred to as an example.

Figure 6:
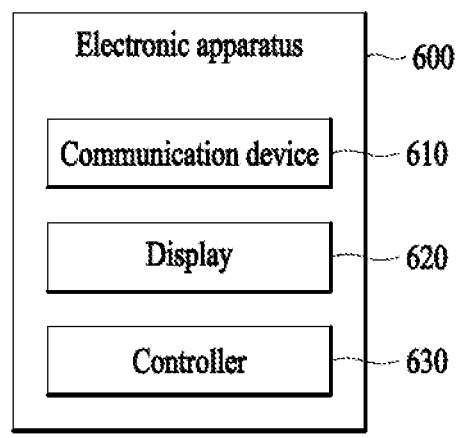
FIG. 6 shows a block diagram of an electronic apparatus according to an example embodiment.

FIG. 6 shows a block diagram of an electronic apparatus according to an example embodiment.

According to an example embodiment, an electronic apparatus 600 may include a communication device 610, a display 620, and a controller 630. In the electronic apparatus 600 shown in FIG. 6, only elements related to this example embodiment are shown. Therefore, it can be understood by those skilled in the art that general-purpose elements other than the elements shown in FIG. 6 may be further included. The above description of the electronic apparatus is applicable to the electronic apparatus 600, and thus a redundant description thereof will be omitted.

The communication device 610 is an apparatus for performing wired/wireless communication and may communicate with an external apparatus. The external apparatus may be a terminal or a server. Also, communication technology used by the communication device 610 may include Global System for Mobile (GSM) communication, Code Division Multi-Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), and the like. In an example embodiment, the communication device 610 may be referred to as a transceiver, and the electronic apparatus 600 may exchange information with a terminal through the transceiver.

The display 620 may display information related to the operation of the electronic apparatus 600. Alternatively, the display 620 may display information related to a screen displayed through an application.

The controller 630 may control the overall operation of the electronic apparatus 600 and process data and signals. The controller 630 may include at least one hardware unit. Also, the controller 630 may be operated by one or more software modules that are generated by executing program code stored in a memory. The controller 630 may include a processor and a memory. The processor may execute program code stored in the memory, control the overall operation of the electronic apparatus 600, and process data and signals. Also, according to an example embodiment, the controller 630 may include at least one processor.

The controller 630 may identify at least one first category related to a product corresponding to the search term and may identify a second category corresponding to a subcategory of the first category. Also, the controller 630 may extract, as an image corresponding to the second category, an image of a product that satisfies a certain condition from a product list included in the second category. The controller 630 may provide related information such that the product list corresponding to the search term is displayed in a first region of the application and may provide related information such that information on the second category and an image of the second category are displayed in a second region distinct from the first region.

According to the above-described example embodiments, an electronic apparatus or a terminal may include a processor, a memory configured to store and execute program data, a permanent storage such as a disk drive, a communication port configured to communicate with an external apparatus, a user interface device such as a touch panel, a key, and a button, and the like. Methods implemented using software modules or algorithms may be stored on a computer-readable recording medium as computer-readable code or program instructions executable on the processor. Here, the computer-readable recording medium may include a magnetic storage medium (e.g., read-only memory (ROM), random-access memory (RAM), floppy disk, hard disk, etc.), an optical reading medium (e.g., CD-ROM, digital versatile disc (DVD), etc.), and the like. The computer-readable recording medium may be distributed over network-linked computer systems so that the computer-readable code is stored and executed in a distributed fashion. The medium is readable by a computer, stored in a memory, and executed on a processor.

The example embodiments may be described in terms of functional block components and various processing operations. The functional blocks may be realized by various numbers of hardware and/or software components configured to perform specific functions. For example, the example embodiments may employ integrated circuit elements, such as a memory, a processor, a logic, and a look-up table, for executing various functions under the control of one or more microprocessors or other control apparatuses. Similar to the elements being executable with software programming or software elements, the example embodiments may be implemented with a programming or scripting language, such as C, C++, Java, and an assembler, including various algorithms implemented with a combination of data structures, processes, routines or other programming elements. Functional aspects may be implemented with an algorithm executed by one or more processors. Furthermore, the example embodiments may employ any number of related art techniques for electronics configuration, signal processing, data processing, and the like. The terms "mechanism," "element," "means," and "configuration" may be widely used and are not limited to mechanical and physical configurations. The terms may include meaning of a series of routines of software in association with a processor.

The above-described example embodiments are only examples, and other example embodiments may be implemented within the scope of the claims, which will be described below.

What is claimed is:

1. A method performed by an electronic apparatus to provide product information, the method comprising:
   controlling, by a processor of the electronic apparatus, a transceiver of the electronic apparatus to communicate with a user device of a user;
   receiving, by the processor of the electronic apparatus, a search term from the user device;
   identifying a plurality of products associated with the search term;
   determining a plurality of categories associated with the plurality of products associated with the search term;
   determining a distribution of the plurality of products based on the plurality of categories; determining at least one first category for the search term based on the distribution;
   identifying a plurality of second categories corresponding to a plurality of subcategories of the first category and a plurality of images, each image corresponding to one of the plurality of second categories;
   displaying a product list corresponding to the search term in a first region and displaying the plurality of images associated with the plurality of second categories in a second region distinct from the first region, wherein a size of each of the plurality of images is determined based on (i) a display size of the second region and (ii) sales information or review information for a corresponding second category; and
   providing different pieces of information based on a user input pattern of the user for an image of the plurality of images associated with the plurality of second categories, wherein the providing of different pieces of information based on the user input pattern comprises:
      switching a screen to a product page from which the image is extracted and providing information regarding a product from which the image is extracted when the user clicks on the image for a certain period of time:
      switching the screen to a page that shows a list of top-selling products for each of a plurality of second categories and providing related information when the user clicks on the image more than a certain number of times; or
      providing information on a product list corresponding to the second category in a separate screen when the user applies a drag input to the image.

2. The method of claim 1, wherein each of the plurality images is of a corresponding product selected from products included in the second category.

3. The method of claim 2, wherein products associated with the plurality of images are selected from products associated with the plurality of second categories based on the sales information or review information.

4. The method of claim 2, wherein products associated with the plurality of images are selected from products associated with the plurality of second categories based on an entity that sells the products associated with the plurality of images.

5. The method of claim 1, wherein the plurality of images are configured to be updated based on a preset time condition.

6. The method of claim 5, wherein the image is updated according to a preset time condition determined on the basis of an attribute of the product included in the second category.

7. The method of claim 1, further comprising:
displaying a product list corresponding to the plurality of second categories based on an input corresponding to the plurality of images.

8. The method of claim 7, further comprising:
displaying a plurality of third categories corresponding to a plurality of subcategories associated with the plurality of second categories and a second plurality of images corresponding to the plurality of third categories in a third region distinct from the second region and the first region.

9. The method of claim 1, wherein:
the determining of at least one first category associated with the search term comprises identifying a category with a lowest hierarchy among the plurality of categories associated with the search term,
wherein the first region is configured to display a product list related to the at least one first category corresponding to the search term, and
wherein the second region is configured to display information related to the plurality of second categories.

10. The method of claim 1, wherein:
the determining of at least one first category associated with the search term comprises identifying the at least one first category using a learning model based on image information related to the plurality of products, and
wherein the learning model is configured to identify at least one first category corresponding to a lowest hierarchy category from among the plurality of categories corresponding to the plurality of products.

11. The method of claim 1, wherein the determining of at least one first category associated with the search term comprises identifying the plurality of products corresponding to the search term based on information previously stored in a database and identifying at least one first category related to the plurality of products.

12. A non-transitory computer-readable recording medium storing thereon computer-executable instructions that, when executed by a processor of an electronic apparatus, cause the processor to perform steps of:
controlling, by a processor of the electronic apparatus, a transceiver of the electronic apparatus to communicate with a user device of a user;
receiving, by the processor of the electronic apparatus, a search term from the user device;
identifying a plurality of products associated with the search term;
determining a plurality of categories associated with the plurality of products associated with the search term;
determining a distribution of the plurality of products based on the plurality of categories;
determining at least one first category for the search term based on the distribution;
identifying a plurality of second categories corresponding to a plurality of subcategories of the first category and a plurality of images, each image corresponding to one of the plurality of second categories;
displaying a product list corresponding to the search term in a first region and displaying the plurality of images associated with the plurality of second categories in a second region distinct from the first region; and
providing different pieces of information based on a user input pattern of the user for an image of the plurality of images associated with the plurality of second categories, wherein the providing of different pieces of information based on the user input pattern comprises:
switching a screen to a product page from which the image is extracted and providing information regarding a product from which the image is extracted when the user clicks on the image for a certain period of time;
switching the screen to a page that shows a list of top-selling products for each of a plurality of second categories and providing related information when the user clicks on the image more than a certain number of times; or
providing information on a product list corresponding to the second category in a separate screen when the user applies a drag input to the image,
wherein a size of each of the plurality of images is determined based on (i) a display size of the second region and (ii) sales information or review information for a corresponding second category.

13. An electronic apparatus comprising:
a communication device;
a display;
a processor;
a non-transitory computer-readable storage medium storing thereon computer-executable instructions that, when executed by the processor, cause the processor to perform steps of: controlling, by a processor of the electronic apparatus, a transceiver of the electronic apparatus to communicate with a user device of a user;
receiving, by the processor of the electronic apparatus, a search term from the user device;
identifying a plurality of products associated with the search term;
determining a plurality of categories associated with the plurality of products associated with the search term;
determining a distribution of the plurality of products based on the plurality of categories;
determining at least one first category for the search term based on the distribution;
identifying a plurality of second categories corresponding to a plurality of subcategories of the first category and a plurality of images, each image corresponding to one of the plurality of second categories;
displaying a product list corresponding to the search term in a first region and displaying the plurality of images associated with the plurality of second categories in a second region distinct from the first region; and
providing different pieces of information based on a user input pattern of the user for an image of the plurality of images associated with the plurality of second categories, wherein the providing of different pieces of information based on the user input pattern comprises:
switching a screen to a product page from which the image is extracted and providing information regarding a product from which the image is extracted when the user clicks on the image for a certain period of time, switching the screen to a page that shows a list of top-selling products for each of a plurality of second categories and providing related information when the user clicks on the image more than a certain number of times, or providing information on a product list corresponding to the second category in a separate screen when the user applies a drag input to the image, wherein a size of each of the plurality of images is determined based on (i) a display size of the second region and (ii) sales information or review information for a corresponding second category.

\* \* \* \* \*